(12) United States Patent
Mirabal

(10) Patent No.: US 11,266,135 B2
(45) Date of Patent: Mar. 8, 2022

(54) FISH OIL SCENT TRAIL DISPENSER SYSTEM

(71) Applicant: Ruben Mirabal, Vancouver, WA (US)

(72) Inventor: Ruben Mirabal, Vancouver, WA (US)

( * ) Notice: Subject to any disclaimer, the term of this patent is extended or adjusted under 35 U.S.C. 154(b) by 287 days.

(21) Appl. No.: 16/777,075

(22) Filed: Jan. 30, 2020

(65) Prior Publication Data

US 2021/0235676 A1  Aug. 5, 2021

(51) Int. Cl.
*A01K 85/01* (2006.01)
*A01K 97/04* (2006.01)

(52) U.S. Cl.
CPC .............. *A01K 85/01* (2013.01); *A01K 97/04* (2013.01)

(58) Field of Classification Search
CPC ........ A01K 85/01; A01K 97/04; A01K 97/00; A01K 99/00
USPC ............................................ 43/4, 4.5, 42.06
See application file for complete search history.

(56) References Cited

U.S. PATENT DOCUMENTS

| | | | | |
|---|---|---|---|---|
| 2,826,853 A * | 3/1958 | Ralph, I | ................. | A01K 97/04 43/42.06 |
| 5,097,616 A * | 3/1992 | Johnston, Jr. | .......... | A01K 85/01 220/263 |
| 5,117,571 A * | 6/1992 | Sites | ...................... | A01K 97/04 43/4 |
| 5,170,582 A * | 12/1992 | Morgin | .................. | A01K 85/01 43/54.1 |
| 5,187,890 A * | 2/1993 | Johnston | ................. | A01K 85/01 43/25 |
| 5,269,087 A * | 12/1993 | Johnston | ................. | A01K 85/01 43/25 |
| 5,297,354 A * | 3/1994 | McGriff | ................. | A01K 97/06 43/4 |
| 5,775,023 A * | 7/1998 | Botkins | ................... | A01K 97/04 43/4 |
| 5,956,881 A * | 9/1999 | Dehm | .................... | A01K 97/00 43/4 |
| 5,970,644 A * | 10/1999 | Breeze | ................... | A01K 97/04 118/683 |
| 6,039,488 A * | 3/2000 | Krawczyk | ........... | A01M 31/008 401/132 |
| 6,248,085 B1 * | 6/2001 | Scholz | .................. | B65D 47/42 604/2 |
| 6,625,920 B1 * | 9/2003 | Rockwell | ............... | A01K 97/04 43/4 |
| 6,880,765 B2 * | 4/2005 | Tuomikoski | ........ | A01M 31/008 239/34 |

(Continued)

FOREIGN PATENT DOCUMENTS

| | | | | |
|---|---|---|---|---|
| CN | 201550513 U | * | 8/2010 | ............. A01K 97/02 |
| GB | 2558557 A | * | 7/2018 | ............. A01K 85/01 |
| WO | WO-2014055051 A | * | 4/2014 | ............. A01K 85/01 |

*Primary Examiner* — Christopher P Ellis

(57) ABSTRACT

A fish oil scent trail dispenser system to create a scent trail to a user's bait when fishing in fresh water and salt water. A kit containing one or more scent dispensers includes a fill tube that can be used to insert the user's favorite scent into the scent dispenser quickly and easily. The scent dispenser includes a main container with a refillable reservoir and a thin dispenser tube. An attachment tube is bound to the main container by a wrapper. The scent dispenser system includes an attachment line with a clip on each end to attach the system to the main fishing line, and a bumper bead to control the position of the scent dispenser on the attachment line.

8 Claims, 4 Drawing Sheets

(56) References Cited

U.S. PATENT DOCUMENTS

| | | | | |
|---|---|---|---|---|
| 7,043,870 B1* | 5/2006 | Sydow | .................... | A01K 91/06 43/42.06 |
| 7,296,378 B1* | 11/2007 | Cobb | ..................... | A01K 85/01 43/4 |
| 7,520,086 B2* | 4/2009 | Melhorn | ................ | A01K 91/06 43/42.06 |
| 7,805,878 B2* | 10/2010 | Thomsen | ................ | A01K 97/04 43/4 |
| 8,424,235 B1* | 4/2013 | Anderson | ............. | A01K 85/01 43/4 |
| 8,635,803 B1* | 1/2014 | Cartwright | ............. | A01K 93/00 43/17 |
| 9,155,291 B1* | 10/2015 | Russ | ...................... | A01K 97/04 |
| 11,019,811 B2* | 6/2021 | Partridge | ............... | A01K 85/01 |
| 2003/0009927 A1* | 1/2003 | Rice | ....................... | A01K 85/16 43/42.06 |
| 2003/0014901 A1* | 1/2003 | Dobbs | ................. | A01K 97/045 43/55 |
| 2006/0005456 A1* | 1/2006 | Harris | .................... | A01K 85/01 43/42.06 |
| 2006/0213115 A1* | 9/2006 | Hubscher | ............... | A01K 91/06 43/44.9 |
| 2006/0218848 A1* | 10/2006 | Melhorn | ................ | A01K 97/02 43/44.99 |
| 2006/0254117 A1* | 11/2006 | Hobbs | ................... | A01K 83/06 43/4 |
| 2009/0019761 A1* | 1/2009 | Thomsen | ............... | A01K 85/01 43/42.06 |
| 2010/0281755 A1* | 11/2010 | Armour | ................ | A01K 97/04 43/42.06 |

* cited by examiner

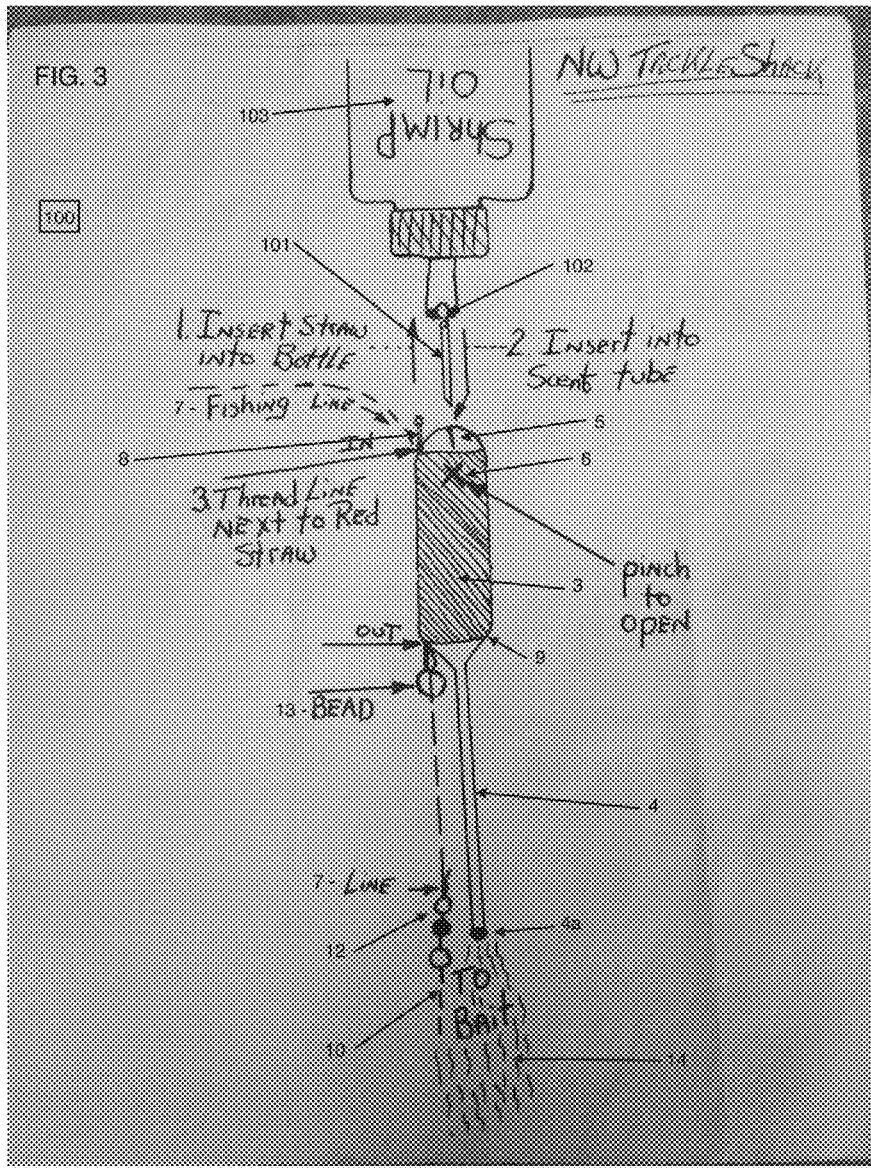
FIG. 3
FIG. 4
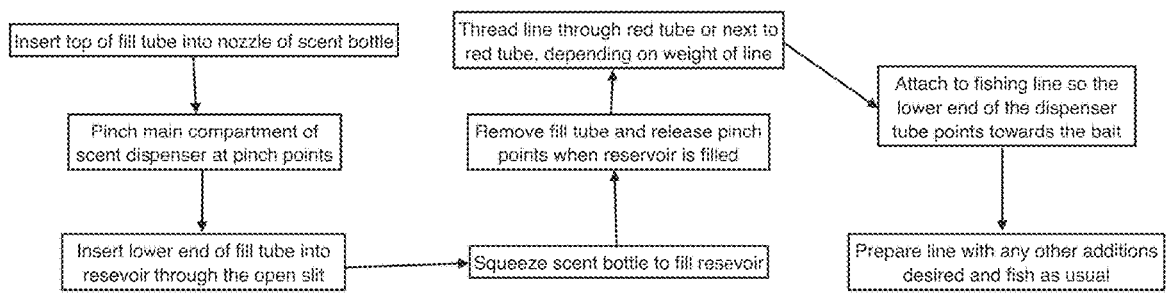

FISH OIL SCENT TRAIL DISPENSER SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of recreational fishing and fishing lures. More specifically, the invention is a fish oil scent trail dispenser system to create a scent trail to a user's bait.

2. Description of the Related Art

Fishing has a history nearly as long as the human species. Although commercial fishing has evolved significantly over the years in order to keep up with the universal demand for seafood, the original struggle of person against fish remains popular whether one is fishing for recreation, competition, or just for dinner.

Sometimes people use scent trails to attract fish to the lure. Porous containers filled with chum can be used to create a larger trail to attract fish and encourage them to bite. Another method is to create a scent mixture using water-based or oil-based scents from the bait needed to attract the desired fish species, and then dip the bait in the scent mixture before attaching it to the lure. Carlton Holliday, *Scents and Attractants: Do They Work?*, available at bassresource.com/fishing/scents-and-attractants.html (last read Oct. 10, 2019). Some bait comes pre-dipped in various scent packages, which can contain garlic and salt, and some companies manufactured bait to emit a scent trail. Id.

Some water-based scents can fly off the bait when casting. Id. Oil-based scents are generally considered to stay on the bait longer and create a better scent trail. Id. However, even oil-based scents will eventually wear off the bait. See Id. Using a porous container with chum inside it is not always feasible for a number of different forms of fishing, or a number of different types of fish, and requires a user to actually use chum. Bait manufactured to emit a scent trail can be expensive, and is one-time use only.

Ideally, a fish oil scent trail dispenser should provide a long-lasting and continuous scent trail and, yet would operate reliably, be reusable, and be manufactured at a modest expense. Thus, a need exists for a reliable fish oil scent trail dispenser system to avoid the above-mentioned problems.

BRIEF SUMMARY OF THE INVENTION

In view of the foregoing disadvantages inherent in the known fishing scent trail art, the present invention provides a novel fish oil scent trail dispenser. The general purpose of the present invention, which will be described subsequently in greater detail, is to provide a fish oil scent trail dispenser that can be attached to the fishing line to emit a scent trail that is directed towards the bait, and thus the lure, allows the user to decide on what scent to use, and is also reusable.

The fish oil scent trail dispenser can disperse your favorite scent into the water creating a scent trail to your bait. The plastic tubes that contain the scent are made of food grade plastic and are contaminant free. The scent tubes can be used in fresh water and salt water. The fill tube included in kit is for inserting into the tip of the user's favorite scent bottle nozzle, making filling the scent tube a quick and easy task. The beads are a bumper stop, thread bead onto line first then scent tube. Simply run a line through the attachment support tube or through the opening along side of attachment support tube ahead of the user's terminal tackle. The fish oil scent trail dispenser is strong yet very light-weight.

The present invention holds significant improvements and serves as a fish oil scent trail dispenser and refill system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention that are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures that accompany the written portion of this specification illustrate embodiments and method(s) of use for the present invention, a fish oil scent trail dispenser, constructed and operative according to the teachings of the present invention.

FIG. 3 is a perspective view illustrating how to fill a fish oil scent trail dispenser according to an embodiment of the present invention of FIG. 1.

FIG. 4 is a flow chart illustrating how to load and attach a fish oil scent trail dispenser according to an embodiment of the present invention of FIG. 1.

The various embodiments of the present invention will hereinafter be described in conjunction with the appended drawings, wherein like designations denote like elements.

DETAILED DESCRIPTION

As discussed above, embodiments of the present invention relate to a fish oil scent trail dispenser and more particularly to a fish oil scent trail dispenser system as used to improve the dispersion of a scent trail towards the bait, allow a user to customize the scent, and allow reuse.

Figure 1:
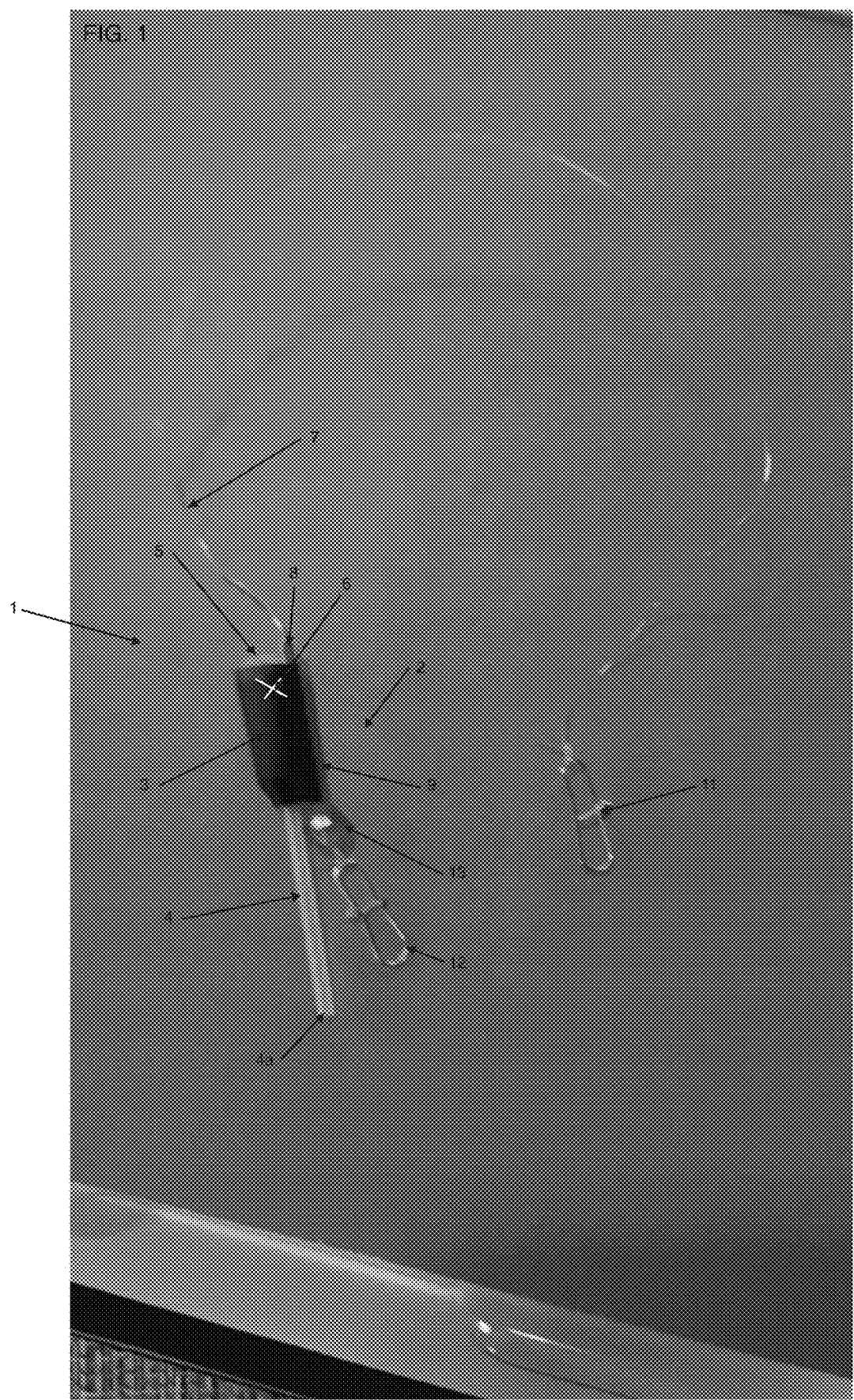
FIG. 1 shows a perspective view illustrating a fish oil scent trail dispenser according to an embodiment of the present invention.
Figure 2:
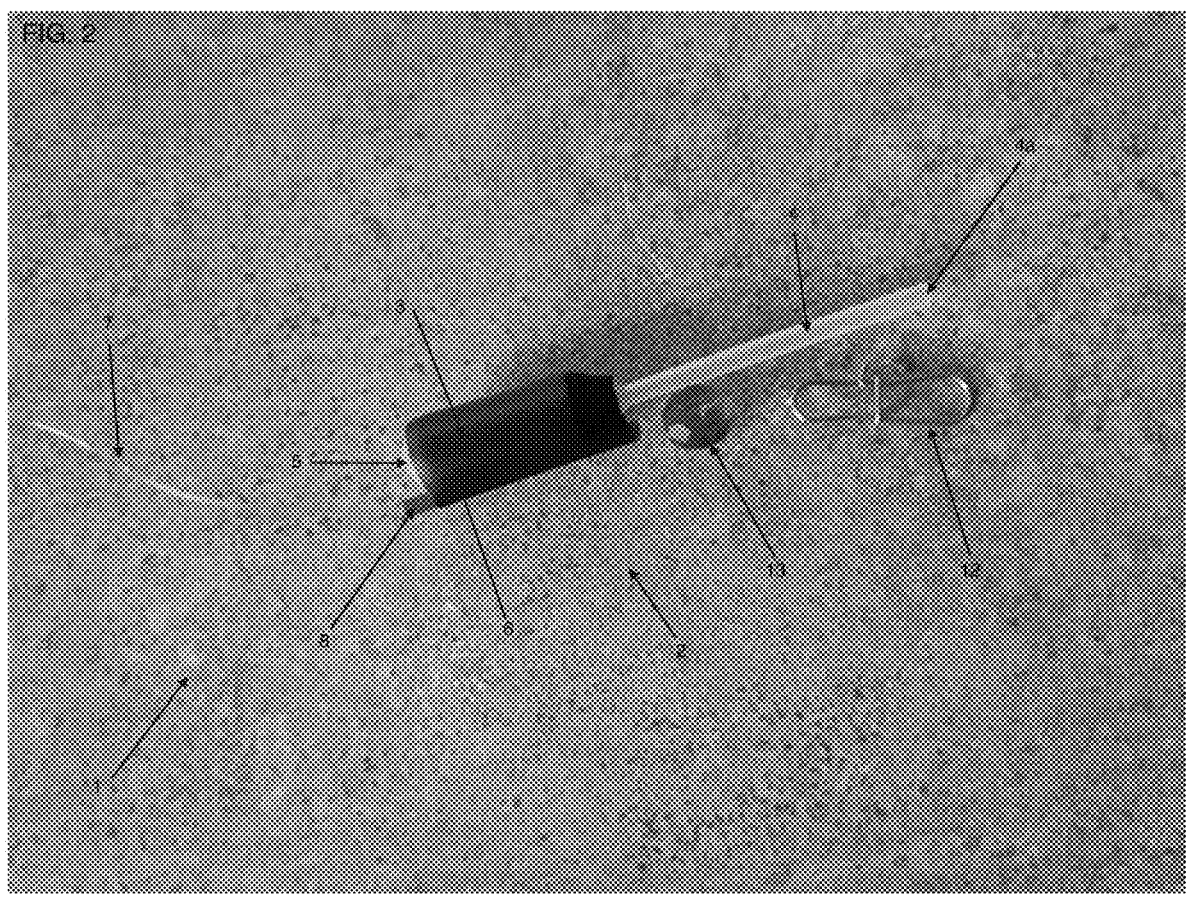
FIG. 2 is another perspective view illustrating a fish oil scent trail dispenser according to an embodiment of the present invention of FIG. 1.

Referring to the drawings by numerals of reference, there is shown in FIGS. 1-2, the scent trail dispenser 1 includes a main container 2 that is formed by a reservoir 3 with a thin dispenser tube 4 extending from a lower end of the reservoir 3. The dispenser tube 4 is open at a lower end 4a to allow the scent to disperse in the water towards the bait. The main container 2 is made of a strong and light-weight food grade plastic and is contaminant free. A top end of the reservoir 3 has a slit 5 that can be opened by pinching the reservoir 3 on either side of the slit 5 at the pinch points 6.

The pinch points 6 are located at the top end of the main container 2 on the reservoir part 3 on either side of the slit 5, so that when the pinch points 6 are pinched, the edges of the slit 5 separate, creating an opening. When pressure is removed from the pinch points 6, the edges of the slit return together, closing the opening. The reservoir 3 can be filled through this slit 5 using the fill tube 101 and a scent or scent blend of the user's choice. The reservoir 3 is preferably filled with a fish oil or a scent blend. The scent trail dispensers 1 can be used in fresh water and salt water.

The scent trail dispenser 1 is attachable to a fishing line 7. The scent trail dispenser 1 can be attached to an attachment line 7 less than 20 lbs by threading the line through the attachment tube 8. Larger diameter line 7, such as 20 lbs and up can be threaded through the wrapping 9 next to the attachment tube 8. The wrapping 9 surrounds and holds together the main container 2 and the attachment tube 8.

A line 7 with a clip 11, 12 on either end runs through the attachment tube 8 or through the wrapping 9 next to the attachment tube 8. The line 7 has a bead 13 secured on the side of the line 7 that is next to the lower end of the reservoir 3. The snap 11 attaches to the rod side of the main fishing line 10, while the bottom snap 12 attaches to the lure or bait end of the main fishing line 10. The bead 13 is a bumper stop to prevent the scent dispenser 1 from sliding too far down the line 7. The line 7 is replaceable. A new line 7 can be attached by tying on a the bead 13 and running the line through the red support tube 8 or through the opening along side of red support tube 8 ahead of the user's terminal tackle.

Figure 5:
FIG. 5 is a perspective view illustrating a kit of fish oil scent trail dispensers according to an embodiment of the present invention.

Referring now to FIGS. 3 and 5, showing the fish oil scent dispenser system loading and refill kit 100. The loading and refill kit 100 requires a fill tube 101 that may be sold as kit including the following parts: at least one fish oil scent dispenser 1, and at least one fill tube 101; and at least one set of user instructions that explain how to load/refill the reservoir 3. T fish oil scent dispenser system loading and refill kit 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Referring now to FIG. 4, showing a flow chart regarding the steps to load or refill the fish oil scent dispenser system. A top end fill tube 101 is inserted into the nozzle 102 of a bottle of the user's preferred fish oil or scent blend 103. The user then pinches the main container 2 at the pinch points 6 to open the slit 5. The lower end of the fill tube 101 is inserted into the slit opening 5, and the scent bottle 103 is squeezed so the scent runs down the fill tube 101 to fill the reservoir 3. The scent dispenser 1 is then attached to the fishing line 10 by the two clips 11, 12 so that the lower end 4a of the dispenser tube 4 is operationally arranged to release a scent trail 14 towards the bait.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A scent dispenser for fishing comprising:
    (a) a main container including
        (i) a reservoir part with a top end and a lower end,
        wherein the reservoir part has an openable slit in the top end,
        wherein the reservoir has two pinch points at each end of the slit, and
        wherein the slit is operationally arranged to open when a user applies pressure at the pinch points, and close when pressure is released; and
        (ii) a dispenser tube part,
        wherein the dispenser tube part is located at the lower end of the reservoir part;
    (b) an attachment tube;
    (c) a wrapper,
    wherein the attachment tube is operationally bound to the reservoir part of the main container by the wrapper.

2. The scent dispenser according to claim 1, wherein the main container comprises a food-safe plastic material.

3. The scent dispenser according to claim 1, wherein the attachment tube comprises a plastic material.

4. A fishing scent dispenser system comprising:
    (a) the scent dispenser according to claim 1;
    (b) an attachment line with an upper clip at first end and a lower clip at a second end,
    wherein the line is threaded through the attachment tube or through the wrapper next to the attachment tube to operationally secure the fishing scent dispenser to the line, and
    wherein the upper clip and the lower clip are operationally arranged to removeably clip the scent dispenser system to a main fishing line; and
    (c) a bumper bead, wherein the bumper bead is operationally attached to the line above the lower clip at the second end to prevent the scent dispenser from sliding further down the line towards the second end.

5. The fishing scent dispenser system according to claim 4, wherein the attachment line is threaded through the attachment tube if the attachment line has a weight rating of less than twenty pounds, and
wherein the attachment line is threaded between the wrapper and the main container, next to the attachment tube if the attachment line has a weigh rating of twenty pounds or more.

6. A fishing scent dispenser system kit comprising:
(a) one or more scent dispenser systems according to claim 4; and
(b) one or more fill tubes.

7. The fishing scent dispenser system kit of claim 6, wherein the kit further comprises:
(c) a set of instructions for filling or refilling the scent dispenser.

8. A method of filling and refilling the scent dispenser according to claim 1, the method comprising the steps of:
(a) providing a scent dispenser according to claim 1;
(b) providing a fill tube with an upper end and a lower end;
(c) providing at least one bottle of scent;
(d) inserting the upper end of the fill tube into a nozzle of the bottle of scent;
(e) opening the slit in the reservoir of the scent dispenser by applying pressure to the pinch points;
(f) inserting the lower end of the fill tube into the open slit;
(g) moving scent from the bottle of scent into the reservoir of the scent dispenser by squeezing the bottle of scent so scent flows through the fill tube into the reservoir;
(h) removing the lower end of the fill tube from the open slit; and
(i) releasing pressure on the pinch points of the scent dispenser.

* * * * *